US008645399B2

(12) United States Patent
McNeill et al.

(10) Patent No.: US 8,645,399 B2
(45) Date of Patent: Feb. 4, 2014

(54) DYNAMIC RECORD BLOCKING

(75) Inventors: William P. McNeill, Seattle, WA (US); Andrew Borthwick, Kirkland, WA (US)

(73) Assignee: Intelius Inc., Bellevue, WA (US)

( * ) Notice: Subject to any disclaimer, the term of this patent is extended or adjusted under 35 U.S.C. 154(b) by 0 days.

(21) Appl. No.: 13/349,414

(22) Filed: Jan. 12, 2012

(65) Prior Publication Data
US 2013/0173560 A1 Jul. 4, 2013

Related U.S. Application Data

(60) Provisional application No. 61/582,775, filed on Jan. 3, 2012.

(51) Int. Cl.
G06F 17/30 (2006.01)

(52) U.S. Cl.
USPC ............ 707/752; 707/808; 707/737; 707/738; 707/692; 707/698; 707/812; 717/159; 711/162; 711/147; 375/240.24; 709/201; 709/203; 709/213; 709/217

(58) Field of Classification Search
USPC .......... 707/738, 737, 692, 698, 812; 717/159; 711/162, 147; 382/305; 375/240.24, 375/240, 24
See application file for complete search history.

(56) References Cited

U.S. PATENT DOCUMENTS

| 5,497,486 | A | 3/1996 | Stolfo et al. |
|---|---|---|---|
| 5,515,534 | A | 5/1996 | Chuah et al. |
| 5,668,987 | A | 9/1997 | Schneider |
| 5,717,915 | A | 2/1998 | Stolfo et al. |
| 5,802,518 | A | 9/1998 | Karaev et al. |
| 5,819,291 | A | 10/1998 | Haimowitz et al. |
| 5,960,430 | A | 9/1999 | Haimowitz et al. |
| 5,970,482 | A | 10/1999 | Pham et al. |
| 5,991,758 | A | 11/1999 | Ellard |
| 6,092,034 | A | 7/2000 | McCarley et al. |
| 6,336,117 | B1 | 1/2002 | Massarani |
| 6,438,741 | B1 | 8/2002 | Al-omari et al. |
| 6,578,056 | B1 | 6/2003 | Lamburt |
| 6,598,042 | B1 | 7/2003 | Kienan |
| 6,804,662 | B1 | 10/2004 | Annau et al. |
| 7,290,019 | B2 | 10/2007 | Bjorner et al. |
| 7,464,125 | B1 * | 12/2008 | Orszag et al. .......... 1/1 |
| 7,899,796 | B1 | 3/2011 | Borthwick et al. |
| 8,131,687 | B2 * | 3/2012 | Bates et al. .................. 707/692 |
| 8,190,836 | B1 * | 5/2012 | Zheng et al. .................. 711/162 |
| 8,204,867 | B2 * | 6/2012 | Benhase et al. .............. 707/692 |
| 8,234,468 | B1 * | 7/2012 | Deshmukh et al. .......... 711/162 |
| 8,364,652 | B2 * | 1/2013 | Vijayan et al. ............... 707/692 |

(Continued)

OTHER PUBLICATIONS

Elmagarmid, Ahmed K. et al., "Duplicate Record Detection: A Survey," IEEE Transactions on Knowledge and Data Engineering, vol. 19, No. 1, Jan. 2007, pp. 1-16.

(Continued)

Primary Examiner — Frantz Coby
(74) Attorney, Agent, or Firm — Nixon & Vanderhye P.C.

(57) ABSTRACT

Dynamic blocking determines which pairs of records in a data set should be examined as potential duplicates. Records are grouped together into blocks by shared properties that are indicators of duplication. Blocks that are too large to be efficiently processed are further subdivided by other properties chosen in a data-driven way. We demonstrate the viability of this algorithm for large data sets. We have scaled this system up to work on billions of records on an 80 node Hadoop cluster.

22 Claims, 10 Drawing Sheets

(56) References Cited

U.S. PATENT DOCUMENTS

| | | | |
|---|---|---|---|
| 8,443,153 B1* | 5/2013 | Edwards et al. | 711/147 |
| 2004/0172393 A1 | 9/2004 | Kazi et al. | |
| 2005/0183079 A1* | 8/2005 | Bharadwaj | 717/159 |
| 2008/0005141 A1* | 1/2008 | Zheng et al. | 707/101 |
| 2008/0065630 A1 | 3/2008 | Luo et al. | |
| 2010/0111446 A1* | 5/2010 | Lim et al. | 382/305 |
| 2010/0211616 A1* | 8/2010 | Khandelwal et al. | 707/812 |
| 2011/0029497 A1* | 2/2011 | Benhase et al. | 707/698 |
| 2011/0071989 A1* | 3/2011 | Wilson et al. | 707/692 |
| 2012/0084268 A1* | 4/2012 | Vijayan et al. | 707/692 |
| 2012/0084269 A1* | 4/2012 | Vijayan et al. | 707/692 |
| 2012/0254173 A1* | 10/2012 | Graefe | 707/737 |
| 2012/0254183 A1* | 10/2012 | Ailon et al. | 707/738 |
| 2012/0317084 A1* | 12/2012 | Liu | 707/692 |
| 2013/0044820 A1* | 2/2013 | Haimi-Cohen et al. | 375/240.24 |

OTHER PUBLICATIONS

A.J. Lait and Brian Randell. An assessment of name matching algorithms. Unpublished. Sep. 1995. Available from the author at Brian.Randell@newcastle.ac.uk.

Acharya, S., Gibbons, P., Poosala, V., Ramaswamy, S., Join Synopses for Approximate Query Answering, In Proceedings of the ACM SIGMOD Conference, pp. 275-286. ACM Press, 1999. # 287.

Aoki, P., "Algorithms for Index-Assisted Selectivity Estimation," In ICDE, p. 258, 1999. # 288.

Arellano, M.G. et al., "A probabilistic approach to the patient identification problem," Proceedings of the Fifth Annual Symposium on Computer Applications in Medical Care (Nov. 1981).

Arellano, M.G., "An implementation of a two-population Fellegi-Sunter probability model," U.S. Dept. of the Treasure, Publication 1200 (Dec. 1985).

Arellano, M.G., "Assessing the significance of a match," unpublished. Advanced Linkage Technologies of America, Inc. (Jan. 17, 1995).

Arellano, M.G., "Issues in identification and linkage of patient records across an integrated delivery system," Journal of Healthcare Information Management, 12 (3) 43-52 (Fall 1998).

Arellano, Max G.. An implementation of a two-population Fellegi-Sunter probability model. U.S. Department of the Treasury, Publication 1299. Dec. 1985.

Poosala, V., Ioannidis, Y., "Selectivity Estimation Without the Attribute Value Independence," Proceedings of VLDB, Athens Greece, pp. 486-495, Aug. 1997. # 308.

Barbara, D., DuMouchel, W., Faloutsos, C., Haas, P., Hellerstein, J., Ioannidis, Y., Jagadish, H., Johnson, T., Ng, R., Poosala, V., Ross, K., Sevcik, K., "The New Jersey Data Reduction Report, Data Engineering Bulletin," 20 (4), 1997. #289.

Belin, T.R. and Rubin, D.B., "A Method for Calibrating False-Match Rates in Record Linkage," Journal of The American Statistical Association, vol. 90, Issue 430, 697-707 (Jun. 1995).

Berger, A.L., et al., "A comparison of criteria for maximum entropy/minimum divergence feature selection," in Proceedings of the Third Conference on Empirical Methods in Natural Language Processing, N. Ide and A. Boutilainen, Eds., The Association for Computational Linguistics, pp. 97-106 (Jun. 1988).

Berger, A.L., et al., "A maximum entropy approach to natural language processing," Computational Linguistics 22(1):39-71 (1996).

Berger, Adam L., Stephen A. Della Pietra, Vincent J. Della Pietra. "An entropy maximum approach to natural language processing." Computational Linguistics, 22(1):39-71 (1996).

Bertolazzi, P. et al., "Supporting Trusted Data Exchanges in Cooperative Information Systems," pp. 1-37, Rome, Italy.

Bitton, D., DeWitt, D, Duplicate Record Elimination in Large Data Files. ACM Transactions on Database Systems 8 (1983), No. 2, 255-265. #312.

Borthwick, "The ChoiceMaker 2 Record Matching System," ChoiceMaker Technologies, Inc., pp. 1-7, (Nov. 1994).

Borthwick, A., "A Maximum Entropy Approach to Named Entity Recognition," PhD thesis, New York University, Available from the NYU Computer Science Dept. Library or at http://cs.nyu.edu/cs/projects/proteus/publication/index.html (1999).

Caruso, F., et al., "Telcordia's Database Reconciliation and Data Quality Analysis Tool," Proceedings of the 26th International Conference on Very Large Databases, Cairo, Egypt (2000).

Chakrabarti, K., Garofalakis, M., Rastogi, R., Shim, K., "Approximate Query Processing Using Wavelets," In Proceedings of 26th International Conference on Very Large Data Bases, Cairo, Egypt, pp. 111-122, 2000. # 290.

Chen, C., Roussopoulos, N., Adaptive Selectivity Estimation Using Query Feedback In Proceedings of the 1994 ACM SIGMOD International Conference on the Management of Data, pp. 161-172. ACM Press, 1994. # 291.

Chen, Ming-Syan et al., "Data Mining: An Overview from a Database Perspective," IEEE Transactions on Knowledge and Data Engineering, vol. 8, No. 6 1041-4347/96; 866-883, (Dec. 1996).

Christen, P., Churches, T, ."Febrl—Freely extensible biomedical record linkage," Release 0.2 edition, Apr. 2003. # 283.

Christen, P., "Probabilistic Name and Address Cleaning and Standardisation".

Christodoulakis, S., "Estimating Block Transfers and Join Sizes," In Proceedings of the ACM SIGMOD International Conference on Management of Data, pp. 40-54, San Jose, California, May 1983. # 313.

Christodoulakis, S., "Estimating Record Selectivities," Information System, 8(2): 105-115, 1983. # 322.

Cochinwala, Kurien, Lalk, Shasha, Citations: Efficient Data Reconciliation—, hppt://citeseer.nj.nec.com/context/2036079/0 (printed Nov. 17, 2003).

Cochinwala, M., Dalal S., Elmagarmid A., and Verykios, V., "Record Matching: Past, Present and Future," Submitted to ACM Computing Surveys (2003) # 286.

Cochinwala, M., et al., "Efficient data reconciliation" Information Sciences 137 (2001) 1-15, Telcordia Technologies Inc. Published by Elsevier Science Inc.

Cochinwala, M., et al., "Arroyo: An Efficient Data Cleaning Tool," pp. 1-21 (Nov. 4, 1997).

Cohen, W., Richman, J., "Learning to Match and Cluster Large High-Dimensional Data Sets For Data Integration," In SIGKDD'02, 6 pages (2002) # 278.

Cohen, W., "WHIRL: A Word-based Information Representation Language," Artificial Intelligence, 118:163-196, (2000). # 282.

Cohen, W.W., "Integration of heterogeneous databases without common domains using queries based on textual similarity," Proceedings of the ACM SIGMOD Conference on Data Management (1998).

Cohen, William W., "Some practical observations on integration of Web information," WebDB '99. 1999.

Copas, J.B., and Hilton, F.J., "Record Linkage: Statistical Models for Matching Computer Records," Journal of The Royal Statistical Society, Series A (Statistics in Society), vol. 153, Issue 3, 287-320 (1990).

Crystal, M.R. et al., Studies in Data Annotation Effectiveness, Proceedings of the DARPA BRoadcase News Workshop (HUB-4) (Feb. 1999).

Della Pietra, S., et al., "Inducing features of random fields," Technical Report CMU-CS-95-144, Carnegie Mellon University (1995).

Desjardins, M., Getoor, L., Koller, D., "Using Feature Hierarchies in Bayesian Network Learning" (Extended Abstract), Lecture Notes in Artificial Intelligence, 1864, (2000). # 292.

Dey, D., Mookerjee, V., "A Sequential Technique for Efficient Record Linkage," Submitted to Operations Research Journal, (2000). Not included—no longer accessible.

Dey, D., Sarkar, S., De, P., "Entity Matching in Heterogeneous Databases: A Distance Based Decision Model," Proceedings of the 31st Hawaii International Conference on System Sciences, 1998. # 318.

Du Bose, Jeff Stokes. "Retaining duplicate data in an immunization registry." Pamphlet distributed by Scientific Technologies Corporation. Aug. 1998.

DuBose, J.S., "Defining duplicate records in an immunization registry," Pamphlet distributed by Scientific Technologies Corp. (Aug. 1998).

Elfeky, M., Verykios, V., Elmagarmid, A., "TAILOR: A Record Linkage Toolbox," Proceedings of the ICDE'02, 2002. # 285.

(56) References Cited

OTHER PUBLICATIONS

Elfeky, M.G., et al., "Record Linkage: A Machine Learning Approach, A toolbox, and a Digital Government Web Service," Dept. of Computer Sciences, Purdue University, Technical Report CSD-03-024.
Fair, M.E., et al., "Application of exact ODDS for partial agreements of names in record linkage," Computers and Biomedical Research 24, 58-71 (1991).
Fellegi ,Ivan P. and Alan B. Sunter. "A theory for record linkage." Journal of the American Statistical Association 64. 1183-1210. Dec. 1969.
Friedman, C. et al., "Tolerating spelling errors during patient validation," Computers and Biomedical Research 25, 486-509 (1992).
Galhardas, H., Florescu, D., Shasha, D., Simon, E., Saita, C., "Declarative data cleaning: Language, Model, and Algorithms," In Proc. of the 27th VLDB Conf., 2001. # 294.
Galhardas, H., Florescu, D., Shasha, D., SimonE., "AJAX: An Extensible Data Cleaning Tool." In Proceedings of ACM SIGMOD (Dallas, Texas, 2000), pp. 590. # 293 [Galhardas, H., et al., "An extensible framework for data cleaning," Tech. Rep. Institut National De Recherche en Informatique et en Automatique (Jul. 1999)].
Getoor, L., et al., "Selectivity Estimation using Probabilistic Models," ACM SIGMOD May 21-24, 2001, Santa Barbara, California.
Getoor, L., Friedman, N., Koller, D., Pfeffer, A., "Learning Probabilistic Relational Models," In Proceedings of the 18th Conference on Machine Learning, pp. 170-177, San Francisco, CA, 2001. Morgan Kaufmann. # 295.
Haas, P., Swami, A., "Sequential Sampling Procedures for Query Size Estimation," In Proceedings of 1992 ACM SIGMOD International Conference on Management of Data, pp. 341-350, 1992. # 314.
Harangsri, B., Shepherd, J., "Query Size Estimation using Systematic Sampling," Ngu, A. CODAS (1996): 550-553. # 297.
Hernandez, M., Stolfo, S., "Real-world data is dirty: Data Cleansing and the Merge/Purge problem," Journal of Data Mining and Knowledge Discovery, 1 (2), (1998) # 299.
Hernandez, M., Stolfo, S., "The Merge/Purge Problem for Large Databases," In Proc. of 1995 ACT SIGMOD Conf., pp. 127-1 38, (1995) # 300.
Hernandez, Mauricio A. and Salvatore J. Stolfo. "Real-world data is dirty: data cleansing and the merge/purge problem." Journal of Data Mining and Knowledge Discovery 2, 19-37. (1997).
Hernandez-Sherrington, M., "A Generalization of Band Joins and the Merge/Purge Problem," Ph.D. thesis, Department of Computer Sciences, Columbia University, (1996.). # 298.
Hylton, J., "Identifying and Merging Related Bibliographic Records," Master's thesis, Department of Electrical Engineering and Computer Science, Massachusetts Institute of Technology, 1996. # 281.
IBM, "Using Information Entropy to Select Learning Words," Mar. 1992, IBM, 34, 10B, 19-20.
IBM; "Inverting Noun-de-Noun Constructions in French-to-English Translation," in IBM Technical Disclosure Bulletin, IBM; TDB-ACC-No. NN9410243; 1-3 (Oct. 1, 1994).
Ioannidis, Y., Christodoulakis, S., "On the Propagation of Errors in the Size of Join Results," ACM SIGMOD 1991. # 301.
Ioannidis, Y., Poosala, V., "Balancing Histogram Optimality and Practicality for Query Result Size Estimation," In SIGMOD, 233-244, 1995. # 302.
Jaro, M., "Advances in Record-Linkage Methodology as Applied to Matching the 1985 Census of Tampa, Florida," Journal of the American Statistical Association 84(1989), No. 406, 414-420. # 284.
Jaro, M.A., "Probabalistic linkage of large public health data files," Statistics in Medicine 14, 491-498 (1995).
Jaro, Matthew A., Advances in record-linkage methodology as applied to matching the 1985 census of Tampa, Florida. Journal of the American Statistical Association 84. Jun. 1989.
Jaynes, E.T., "Information Theory and Statistical Mechanics," The Physical Review, vol. 106, No. 4, 620-630 (May 15, 1957).
Jin I Li C., Mehrotra, S., Efficient Record Linkage in Large Data Sets Paper 113, UC Irvine Tech Reports, 2001, # 279.

Jocums, Stephanie, Stephen S. Entman, Jr., Edward F. Mitchel, and Joyce M. Piper. Using vital records linkage. American Journal of Preventive Medicine, 11(2):75-78, 1995.
Kilss, B., Alvey, W., Record linkage techniques—1985 Proceedings of the Workshop on Exact Matching Methodologies, May 1985, Department of the Treasury, Internal Revenue Service, Statistics Income Division. Not included—no longer accessible.
Kimball, Ralph, "The science of maintaining clean data in your warehouse, and why nobody talks about it," DBMS, Sep. 1996.
Lipton, R., Naughton, J., Query Size Estimation by Adaptive Sampling (Extended Abstract), Journal of Computer and System Science, 51, 18-25, 1985. #315.
Lipton, R., Naughton, J., Schneider, D., Practical Selectivity Estimation through Adaptive Sampling, In H. Garcia-Molina and H.V. Jagadish, editors, Proceedings of the 1990 ACM SIGMOD International Conference on the Management of Data, pp. 1-11. ACM Press, 1990. # 303.
Lynch, C., Selectivity Estimation and Query Optimization in Large Databases with Highly Skewed Distributions of Column Values Proc. 14th VLDB Conf., Los Angeles, CA, Aug. 1988. #316.
Macleod, M.C.M., et al., "Enhancing the power of record linkage involving low quality personal identifiers: use of the best link principle and cause of death prior likelihoods," Computers and Biomedical Research 31, 257-270 (1998).
Mannino M., Chu, P., Sager, T., Statistical Profile Estimation in Database Systems, Computing Surveys 20, 3 (Sep. 1988), 191-221. # 304.
McCallum, A., Nigam, K., Ungar, L., Efficient Clustering of High-Dimensional Data Sets with Application to Reference Matching, In KDD-00, pp. 1-22 (2000).
Monge, A. , Adaptive detection of approximately duplicate database records and the database integration approach to information discovery. Ph.D. thesis, Department of Computer Science and Engineering, University of California, San Diego, 1997. # 307.
Monge, A., Elkan, C., "An efficient domain-independent algorithm for detecting approximately duplicate database records," In Proc. of SIGMOD-1 997 Workshop on Research Issues on Data Mining and Knowledge Discovery, pp. 23-29, Tucson, AZ, May 1997. #27.
Monge, A., Elkan, C., The Field Matching Problem: Algorithms and Applications, Second International Conference on Knowledge Discovery and Data Mining (1996), 267-270, AAAI Press. # 85.
Monge, A., Matching Algorithms within a Duplicate Detection System Bulletin of the Technical Committee on Data Engineering, 23, 4, 2000, # 306.
Monge, Alvaro E. and Charles P. Elkan. The field matching problem: Algorithms and applications. Proceedings of the second international conference on knowledge discovery and data mining. Aug. 1996.
Muralikrishna, M., DeWitt, D., Equi-depth histograms for estimating selectivity factors for multi-dimensional queries. Proc. ACM SIGMOD, 1988, 28-36. # 321.
Neiling, M., "Data Fusion with Record Linkage," Online Proceedings of the 3rd Workshop Föderierte Datenbanken, (Dec. 11, 1998).
Newcombe, H., Kennedy, J., Axford, S., James, A., Automatic Linkage of Vital Records Science 130 (1959), No. 3381, 954-959. Not included—no longer accessible.
Newcombe, H., Record Linking: The Design of Efficient Systems for Linking Records into Individual and Family Histories, American Journal of Human Genetics 19 (1967), No. 3. Not included—no longer accessible.
Newcombe, H.B., "Handbook of Record Linkage: Methods for Health and Statistical Studies, Administration, and Business," Oxford Medical Publications (1988).
Newcombe, H.B., et al., "The use of names for linking personal records," Journal of the American Statistical Association 87 (Dec. 1992).
Piatetsky-Shapiro, G., Connell, C., Accurate Estimation of the Number of Tuples Satisfying a Condition In Proc. of the ACM SIGMOD Conference, pp. 256-276, 1984. # 319.
Pinheiro, Jose C., et al., "Methods for Linking and Mining Massive Heterogeneous Databases," Proceedings of the Fourth International Conference on Knowledge Discovery and Data Mining (Aug. 27-31, 1998).

(56) References Cited

OTHER PUBLICATIONS

Poosala, V., Histogram-Based Estimation Techniques in Database Systems, Ph. D. thesis, University of Wisconsin-Madison, 1997. Not included—no longer accessible.
Porter, E. H., and W. E. Winkler (1999), Approximate String Comparison and its Effect in an Advanced Record Linkage System, in Record Linkage Techniques Mar. 20-21, 1997, Washington, DC.
Printz, H., "Fast computation of maximum entropy/minimum divergence model feature gain," In Proceedings of the Fifth International Conference on Spoken Language Processing (1998).
Raman, V., Hellerstein, J., Potter's Wheel: An Interactive Data Cleaning System, In Proc. VLDB (Roma, Italy, 2001), pp. 381-390. # 224.
Ratnaparkhi, A., "A Maximum Entropy Model for Part-of-Speech Tagging," Proceedings of the Conference on Empirical Methods in Natural Language Processing, (1996).
Recommendations, The Matching Group, Administrative Records Subcommittee, Federal Committee on Statistical Methodology, pp. 3-4 (May 1985).
Record Linkage Workshop: Bibliography of Background Papers, U.S. Census Bureau, http://www.census.gov.srd/www/reclink/biblio.html (Jul. 18, 2002).
RLESearch—Probabilistic record linking engine, http://nedinfo.nih.gov/docs/RLESearch.htm 19 pages (Jul. 18, 2002).
Rosenfeld, R., "Adaptive Statistical Language Modeling: A Maximum Entropy Approach," PhD thesis, Carnegie Mellon University, CMU Technical Report CMU-CS-94-138 (1994).
Semaphore Corporation. Merge/Purge and Duplicate Detection. Web page. http://www.semaphorecorp.com/mpdd/mpdd.html. 1996.
Sun, W., Ling, Y., Rishe, N., Deng, Y., "An Instant and Accurate Size Estimation Method for Joins and Selection in a Retrieval-Intensive Environment," In Proceedings of the ACM SIGMOD Conference, pp. 79-88, 1993. #317.
The State of Record Linkage and Current Research Problems Winkler, W Proceedings of the Survey Methods Section (1999), 15 pages.
Trecom Business Systems and Dataline Inc., "UPIF process architecture," unpublished system documentation (Oct. 1997).
Ukkonen, E., "Finding Approximate Patterns in Strings," Journal of Algorithms 6:132-137 (1985).
Verykios, V., Elmagarmid, A., Elfeky, M., Cochinwala, M., Dalal, On the Accuracy and Completeness of the Record Matching Process, 5. 2000 Information Quality Conference (2000), 54-69. # 309.
Verykios, Vassilios et al., "Automating the Approximate Record Matching Process," Computer Sciences Dept., Purdue University, West Lafayette, IN, pp. 1-19 (Jun. 15, 1999).
Verykios, Vassilios S., Ahmed K. Elmagarmid, Elias N. Houstis: Automating the approximate record-matching process. Inf. Sci. 126(1-4): 83-98 (2000).
Verykios, Vassilios S., List of publications from the DBLP Bibliography Server—FAQ, 2 pages.
Wavelet-Based Histograms for Selectivity Estimation Matias, Y., Vitter, J., Wang, M. Proc. of the 998 ACM SIGMOD Intern. Conf. on Management of Data, 1998. # 305.
Winkler list of conference (6 pages).
Winkler list of references (6 pages).
Winkler, W. E. "Matching and Record Linkage," in B. G. Cox et al. (ed.) Business Survey Methods, New York: J. Wiley, 374-406 (1995).
Winkler, W. E. (1990), "String Comparator Metrics and Enhanced Decision Rules in the Fellegi-Sunter Model of Record Linkage," Proceedings of the Section on Survey Research Methods, American Statistical Association., 354-359.
Winkler, W. E. (1994), "Advanced Methods for Record Linkage," Proceedings of the Section on Survey Research Methods, American Statistical Association, 467-472 (longer version report May 1994 available at http://www.census.gov/srd/www/byyear.html).
Winkler, W., Exact Matching Lists of Businesses: Blocking, Subfield Identification, and Information Theory In Kilss and Alvey (1985), pp. 227-241, U.S. Internal Revenue Service, Publication 1299 (Feb. 1986). # 311.
Winkler, W., Record Linkage Software and Methods for Merging Administrative Lists Statistical Research Division Technical Report RRO1-03, U.S. Bureau of Census, 2001. # 320.
Winkler, W.E., "Advanced Methods for Record Linkage," Bureau of the Census, Washington DC.
Winkler, W.E., "Matching and Record Linkage," Chapter 20, U.S. Bureau of the Census (1995).
Winkler, W.E., "On Dykstra's Iterative Fitting Procedure," Annals of Probability, vol. 18, issue 3, 1410-1415 (Jul. 1990).
Winkler, W.E., "Record Linkage and Machine Learning," Virginia Tech (Nov. 1, 2001).
Winkler, William E., Presentation given at Virginia Tech on Nov. 1, 2002, entitled "Record Linkage and Machine Learning".
Yuhe Li et al., "Reducing Uncertainties in Data Mining," 1997, IEEE, 0-8186-8271-X/97, 97-105.

\* cited by examiner

BLOCK(records)
1   // Do top-level blocking.
2   blocks = ∅
3   for record ∈ records
4       for property ∈ TOP-LEVEL-PROPERTIES(record)
5           ADD-TO-BLOCKS(blocks, property, record)
6   // Do sub-blocking.
7   correct = ∅
8   for block ∈ blocks
9       correct = correct ∪ SUB-BLOCK(block)
10  return correct SUB-BLOCK(block)
1   if |block.records| == 1
2       return ∅
3   if not OVERSIZE(block)
4       return {block}
5   blocks = ∅
6   for record ∈ block.records
7       for property ∈ SUB-BLOCK-PROPERTIES(record)
8           if property > block.key
9               ADD-TO-BLOCKS(blocks, property, record)
10  correct = ∅
11  for block ∈ blocks
12      correct = correct ∪ SUB-BLOCK(block)
13  return correct ADD-TO-BLOCKS(blocks, key, record)
1   // Let blocks be a table of blocks indexed by block key.
2   if blocks[key] == ∅
3       blocks[key] = blocks[key] ∪ ⟨key, ∅⟩
4   blocks[key].records = blocks[key].records ∪ record

FIG. 3

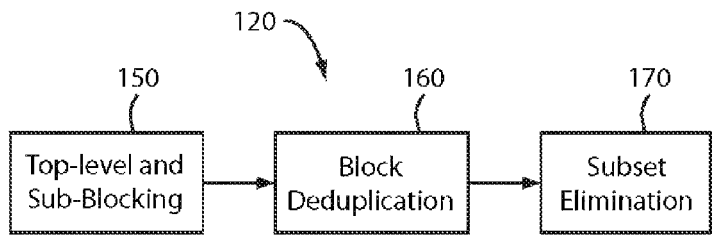

FIG. 4

```
TOP-LEVEL-MAPPER(no-blockkey, record)
1  for property ∈ TOP-LEVEL-PROPERTIES(record)
2      EMIT(property, record)

SUB-BLOCK-MAPPER(blockkey, record)
1  for property ∈ SUB-BLOCK-PROPERTIES(record)
2      if property > blockkey
3          EMIT(blockkey + property, record)

BLOCKING-REDUCER(blockkey, records)
1  buffer = ()
2  destination = CORRECT
3  for record ∈ records
4      buffer = buffer ∪ records
5      if OVERSIZE(buffer)
6          destination = OVERSIZE
7          break
8  if |buffer| == 1
9      return
10 // Dispatch the remaining incoming records.
11 for record ∈ records
12     DISPATCH(blockkey, record, destination)
13 // Dispatch the records in the buffer.
14 for record ∈ buffer
15     DISPATCH(blockkey, record, destination)
```

FIG. 5

DYNAMIC RECORD BLOCKING

CROSS-REFERENCES TO RELATED APPLICATIONS

This application claims the benefit of priority from provisional application No. 61/582,775 filed Jan. 3, 2012, the content of which is incorporated herein by reference.

STATEMENT REGARDING FEDERALLY SPONSORED RESEARCH OR DEVELOPMENT

N/A

FIELD

The technology herein relates to automatic data processing, and more particularly to database management and deduplication. Still more particularly, the technology herein relates to dynamic blocking, which determines which pairs of records in a data set should be examined as potential duplicates, and to scalable blocking techniques for duplicate record detection that operate on the intuitive notion of grouping together records with similar properties and then subdividing the groups using other shared properties until they are all of tractable size.

BACKGROUND AND SUMMARY

A challenge for builders of databases whose information is culled from multiple sources is the detection of duplicates, where a single real-world entity gives rise to multiple records. For example, online citation indexes need to be able to navigate the different capitalization and abbreviation conventions that appear in bibliographic entries; government agencies need to know whether a record for "Robert Smith" living on "Northwest First Street" refers to the same person as one for a "Bob Smith" living on "1st St. NW"; and consumers need to know whether publicly available records correspond to the same or different entity. This problem becomes more significant as the amount of readily available information continues to increase.

A standard machine learning approach to this problem is to train a model that assigns scores to pairs of records where pairs scoring above a threshold are said to represent the same entity. Transitive closure is then performed on this same-entity relationship to find the sets of duplicate records. Comparing all pairs of records is quadratic in the number of records and so therefore is intractable for large data sets. In practice, using an approach called "blocking", only a subset of the possible pairs is referred to the machine learning component and others are assumed to represent different entities. So a "Robert Smith"–"Bob Smith" record pair may be scored while a "Robert Smith"–"Barack Obama" pair is dismissed. This risks a false negative error for the system if the "Robert Smith" and "Barack Obama" records do in fact refer to the same person, but in exchange for this the system runs faster.

The term of art for this process is blocking because it groups similar-seeming records into blocks that a pairwise decision making component (a component which might use either a machine learning or a deterministic technique to determine whether the pair of records should in fact be linked) then explores exhaustively. A common technique of published blocking algorithms is the general strategy of quickly identifying a set of record pairs to pass along to a linkage component.

Previous work relevant to blocking is known. See e.g., A. K. Elmagarmid, P. G. Iperirotis and V. S. Verykios, "Duplicate Record Detection: A Survey," IEEE Transactions on Knowledge and Data Engineering, pages 1-16, 2007; A. Borthwick, A. Goldberg, P. Cheung and A. Winkel, "Batch Automated Blocking And Record Matching," 2005, U.S. Pat. No. 7,899, 796; A. McCallum, K. Nigam and L. H. Ungar, "Efficient Clustering Of High-Dimensional Data Sets With Application To Reference Matching," *Proceedings of the ACM International Conference on Knowledge Discover and Data Mining*, pages 169-178, 2000); M. A. Hernandez and S. J. Stolfo, "Real-world data is dirty, data cleansing and the merge/purge problem," *Journal of Data Mining and Knowledge Discovery* (pages 1-39, 1998). However, additional improvements are possible and desirable.

We describe herein a novel blocking technique for duplicate record detection that operates on the intuitive notion of grouping together records with similar properties and then subdividing the groups using other shared properties until they are all of tractable size. A non-limiting example implementation in the MapReduce framework provides parallel computing that may scale to inputs in the billions of records. We call our overall non-limiting technique dynamic blocking because the blocking criteria adjust in response to the composition of the data set. We want blocking to be a mechanical automatically implemented process, not an art.

One example non-limiting blocking strategy is used to deploy a massive database of personal information for an online people search. This database distills a heterogeneous collection of publicly available data about people into coherent searchable profiles. This distillation process can be framed as a duplicate detection task. We have developed a non-limiting novel blocking procedure that in addition to the standard performance/recall tradeoff is tailored to 1) scale to very large data sets and 2) robustly handle novel data sources. Scaling to very large data sets is useful because we map billions of input records to hundreds of millions of people in the real world. This is possible with distributed computing, and the ability to distribute the work informs the design. Robustly handling diverse data sources is useful because we are acquiring new and diverse sources of information all the time, so the hand-crafting of the blocking procedure by experts can become a bottleneck.

Additional example non-limiting dynamic blocking features and/or advantages of exemplary non-limiting implementations include:

- Extending known blocking algorithms in significant and non-obvious ways
- Adapting blocking algorithms to run in a scalable, distributed computing environment
- Adding a ramp factor for more efficient extraction of the sub-block space
- In common with many known blocking systems, using a general strategy of quickly identifying a set of record pairs to pass along to a linkage component
- Particular advantageous ways to construct sets and handle oversized sets
- Use of known strategy of allowing sets of records to overlap in a new context
- Can be applied to data sets when there is no obvious quickly-calculable metric between records and the number of records makes even a fast calculation for all pairs intractable
- Create multiple top-level blocks that can be worked on independently As records have several property dimensions along which they may vary, no need to try to define a single ordering that places similar records next to each other.

We allow the maximum block size to be a function of the block key length.

This blocking procedure incorporates innovations necessary to make it work on data sets containing billions of records.

The entire system from start to finish including the blocking component that is the focus of this patent can be run in parallel across a distributed cluster of computers.

The blocking algorithm can handle arbitrarily large input record blocks.

Example non-limiting system can be implemented using the MapReduce distributed computing framework.

Pair deduplication and text normalization (while I/O constraints of working with large data sets may prevent a straightforward deduplication of all pairs, a suitable algorithm can perform this deduplication without incurring the I/O costs)

One non-limiting arrangement may directly address errors in the original data, relying instead on multiple top-level keys to catch mis-blockings due to typos, but there is also a possibility to implement text normalization for our system.

Additional record properties such as, for example, Soundex versions of text fields.

Use of pair mechanism to discover relationship between entities.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 3 is an exemplary illustrative non-limiting recursive blocking algorithm;

FIG. 4 is a block diagram of an example non-limiting dynamic blocking and deduplication algorithm;

FIG. 5 is an exemplary illustrative non-limiting iterative MapReduce block algorithm;

DETAILED DESCRIPTION OF NON-LIMITING EXAMPLES

Example Non-Limiting System Overview

Figure 1:
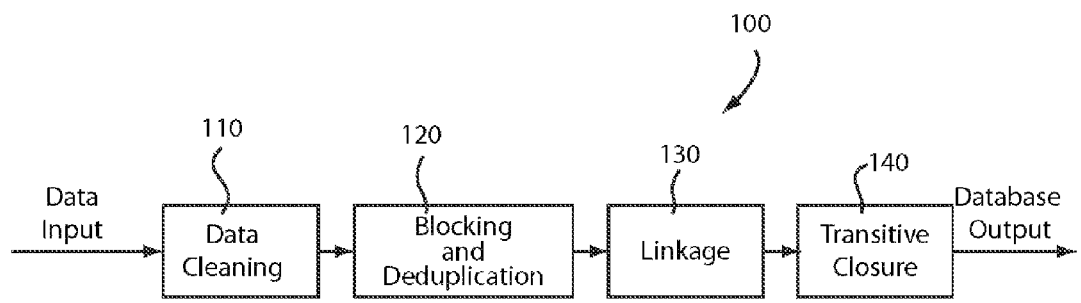
FIG. 1 is a block diagram of an example non-limiting system.

As shown in FIG. 1, raw input to the example non-limiting system 100 described herein consists of publicly available or other personal identification information such as for example name, address, birthday, phone number, and (encrypted) social security number about people in the United States or elsewhere culled from various sources. The record deduplication system 100 has four major components: 1) data cleaning 110, 2) blocking and deduplication 120, 3) linkage 130, and 4) transitive closure 140.

The data cleaning step 110 extracts information from a wide variety of sources and puts it into a uniform record format. It also performs a variety of normalization tasks such as text cleanup and name and address parsing. The linkage step 130 assigns a score to pairs of records using a machine learning model such as described e.g. in S. Chen, A. Borthwick, and V. R. Carvalho, "The Case For Cost-Sensitive And Easy-To-Interpret Models In Industrial Record Linkage," *9th International Workshop on Quality in Databases*, August 2011, incorporated herein by reference. If a pair scores above a threshold, the records are presumed to represent the same person. The transitive closure step 140 uses a distributed version of the union-find algorithm to combine record pairs into connected components. See e.g. http://chasebradford.wordpress.com/2010/10/23/mapreduce-implementation-for-union-find/. The system 100 partitions the input records into disjoint sets called profiles, where each profile corresponds to a single person. The example non-limiting dynamic blocking and deduplication step 120 is described in detail below.

Though the canonical task of one example non-limiting linkage component 130 is to find sets of records that represent the same entity, it is possible to create linkage components that discover other kinds of relationships. More generally, the linkage component may be thought of as a relationship detection component, where belonging-to-the-same-entity is particular kind of relationship. The procedure described herein can be used to block records for these general relationship detection linkage components. For example, we have used this system to create blocks of records that are fed to a linkage component that determines whether a pair of records represent two different people who are related. Other linkage applications and record relationships are also possible.

Dynamic Blocking 120: Blocks and Sub-Blocks

How might we subdivide a huge number of records? We could start by grouping them into sets of the same first and last name. This would go a long way towards putting together records that represent the same person, but it would still be imperfect because people may have nicknames or change their names. To enhance this grouping, we could consider a different kind of information such as social security number. Fraud, error, and omission render SSN imperfectly individuating; however, it will still help us put together records for, say, people who change their name when they get married. We only need a handful of these domain-specific properties to nicely subdivide our data set. The blocks of records they produce may overlap, but this is desirable because it gives transitive closure a chance to join records that blocking did not put together.

These blocks will vary widely in size. We may have a small set of "Barack Obama" records which can then be passed along immediately to the linkage component 130. However, we may have a set of millions of "Robert Smith" records which still needs to be cut down to size. One way to do this is to find other properties to further subdivide this set. The set of all Robert Smiths who have the same middle name is smaller than the set of all Robert Smiths, and intuitively records in this set will be more likely to represent the same person. Additionally, we could block together all the Robert Smiths with the same phone number, or birthday, or who live in the same city. As with the original blocks, overlap between these sub-blocks is desirable. We do not have to be particularly artful in our choice of sub-blocking criteria: any property that seems like it might be individuating will do. As long as we have an efficient way to search the space, we can let the data dynamically choose different sub-blocking strategies for each over-size block.

More formally, this process can be understood in terms of operations on sets. In a set of N records there are ½ N (N−1) unique pairs, so an enumeration over all of them is $O(N^2)$. The process of blocking divides this original set into k blocks, each of which contains at most a fixed maximum of M records. The exhaustive comparison of pairs from these sets is $O(kM^2)$, and the quadratic factor is tractable if we choose a small enough M.

Call the elements in these sets records. An individual record can be thought of as a set of properties, where a property maps a schema (e.g. City or First Name) to a value (e.g. Seattle or Robert). In practice it may be useful to think of properties as functions of the fields actually present in the record. For example, a record may contain separate entries for first and last name but we may prefer to work with a property that is a combination of the two. Or a record may contain a phone number, but we may prefer to work with a property that is just the first three digits. It is possible to define a total ordering on properties. For instance, we can alphabetize them. One non-limiting approach: define a block to be a set of records that share one or more properties in common and represent blocks as tuples of the form (block key, records) where records is the set of records in the block and block key is the set of properties those records have in common. A block key is a unique informative name of a set of records. Blocks whose keys contain multiple properties are the intersections of the blocks who have those individual properties as keys. If we have a total orderings of properties we can define a total ordering on block keys by sorting them lexicographically by property.

In one non-limiting approach, we select a small number of top level properties such as name and social security number to do the initial blocking, and a broader set of sub-blocking properties which are used to subdivide oversized sets (see FIG. 4 item 150). The latter may be a superset of the former. Blocks whose keys consist of a single top-level property are called top-level blocks and blocks that are the result of further subdivision are called sub-blocks.

The algorithm that creates the blocks and sub-blocks takes as input a set of records and a maximum block size M. All the input records are grouped into blocks defined by the top-level properties. Those top-level blocks that are not above the maximum size are set aside. The remaining oversized blocks are partitioned into sub-blocks by sub-blocking properties that the records they contain share, and those properties are appended to the key. The process is continued recursively or iteratively until all sub-blocks have been whittled down to an acceptable size.

The records in a given block will contain a set of sub-blocking properties, and a complete enumeration of the possible sub-blocks requires enumerating the power set of this property set—intersecting the same-birthday sets with the same-phone number sets and intersecting all those with the same-city sets and so forth. We need an efficient way to conduct this exploration, bailing out as soon as possible. To this end, we use the ordering on block keys to define a binomial tree where each node contains a list of block keys and is the parent of nodes that have keys that come later in the ordering appended to the list.

Figure 2:
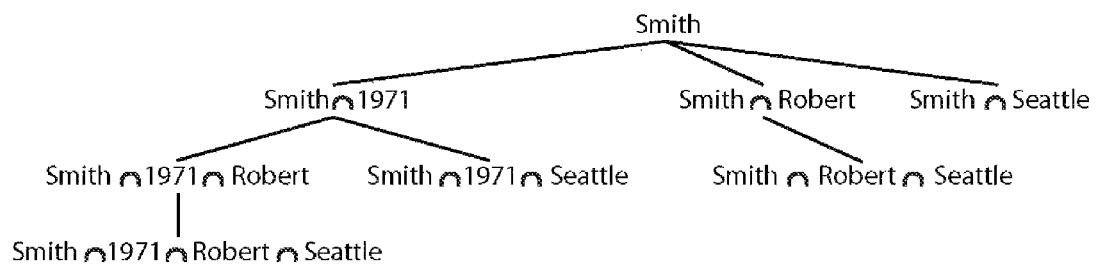
FIG. 2 is an exemplary illustrative non-limiting tree for the oversize top-level set "Smith" wherein the root node of this tree represents an oversized block for the name Smith and the other nodes represent possible sub-blocks; the sub-blocking algorithm enumerates the tree breadth-first, stopping when it finds a correctly-sized sub-block.

FIG. 2 shows an example non-limiting tree for the oversize top-level set Smith with sub-block keys for birth year 1971<first name Robert<city Seattle. With each node of the tree, we can associate a block whose key is the list of blocks keys in that node and whose records are the intersection of the records in those blocks, e.g. the Smith ∩ 1971∩ Seattle node represents all the records for people named Smith who were born in 1971 and live in Seattle. Because the cardinality of an intersected set is less than or equal to the cardinalities of the sets that were intersected, every block in the tree is larger than or equal to any of its children. We traverse the tree breadth-first and only recurse into nodes above the maximum block size. This allows us to explore the space of possible sub-blocks in cardinality order for a given branch, stopping as soon as we have a small enough sub-block.

FIG. 3 shows example non-limiting pseudo-code of a dynamic Block function that performs blocking using a recursive algorithm (another example non-limiting implementation using a Hadoop version of the algorithm is discussed below in connection with FIG. 5).

In FIG. 3, the Block function creates the top-level blocks and each call to the Sub-Block function enumerates one level deeper into the tree. The Oversize function determines if the block is over the maximum size, which in our system is expressed in terms of the maximum number of pairs a block may contain. There is also an additional condition to ignore blocks of size 1 since these will not contain any pairs. Note that we do not know all the sub-block keys that will be present in a given set of records a priori. Instead the algorithm discovers this set as it runs.

In the worst case, all the sub-blocks except the ones with the very longest keys are oversize. Then the sub-blocking algorithm will explore the power-set of all possible blocking keys and thus have exponential runtime. However, as the block keys get longer the sets they represent get smaller and eventually fall beneath the maximum size. In practice these two countervailing motions work to keep this strategy tractable. As will be shown in the experiments, the bulk of the sub-blocks have key lengths of 3 or less.

Scalability Through Parallel (e.g., Cloud based) Computing

In one example non-limiting implementation, the volume of data involved suggests that system 100 be distributed across a cluster of machines. In our example non-limiting implementation, we make heavy use of the conventional Hadoop implementation (see FIG. 12) of the conventional MapReduce computing framework (see FIG. 11). MapReduce is a standard distributed computing framework, as those skilled in the art will understand. Nothing in our example non-limiting implementation is limited to MapReduce per se, but our example non-limiting design accommodates the MapReduce constraint that the components running in parallel do not share memory. Below we discuss the ways constraints of the MapReduce computing framework inform our non-limiting example design implementation. The example non-limiting detailed design presented herein would be appropriate for any MapReduce-like distributed computing environment that imposed this constraint, and other non-limiting implementations could use other parallel processing arrangements.

Figure 11:
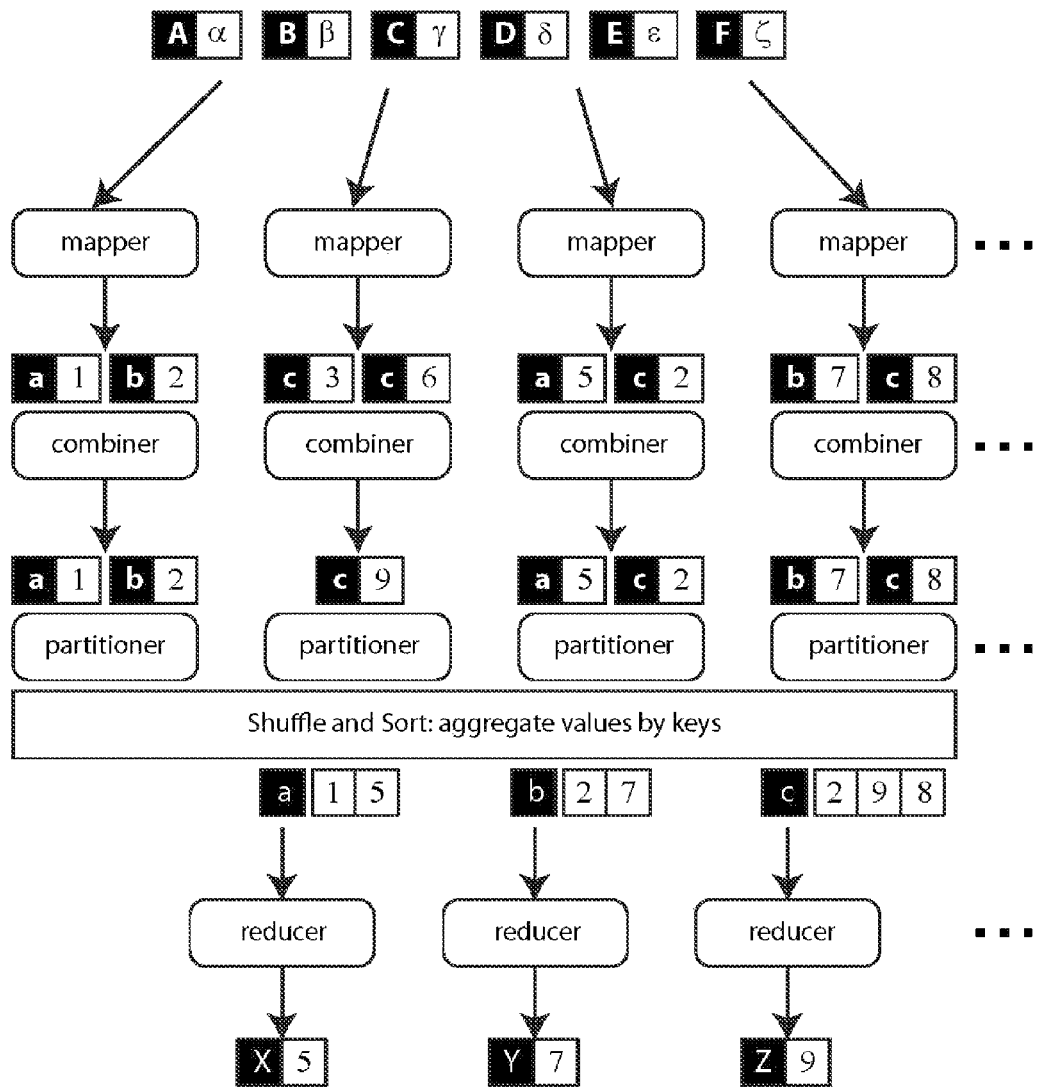
FIG. 11 shows an example non-limiting conventional MapReduce architecture.

Thus, the example non-limiting blocking procedure described here is implemented as a series of Hadoop jobs written in Java. For a full description of the conventional MapReduce framework, see J. Lin and C. Dyer, *Data-Intensive Text Processing with MapReduce*, Synthesis Lectures on Human Language Technologies (Morgan & Claypool, 2010), from which FIGS. 11 & 12 were taken. As shown in FIG. 11, MapReduce divides computing tasks into a map or mapper phase in which the job is split up among multiple machines to be worked on in parallel and a reduce or reducer phase in which the output of the map phase is put back together. In a MapReduce context, recursion becomes iteration. A single MapReduce iteration works down one level of the binomial tree of sub-block intersections.

The ability to handle arbitrarily large input record blocks is an element of scalability. Suppose we (quite sensibly) wanted to block together all records containing the same first and last names. Some names like "Robert Smith" will be very common. It will be impossible to fit all the "Robert Smith" records in memory at the same time. Our system addresses this with the BLOCKING-REDUCER algorithm. In that algorithm we examine the records in a block one at a time, accumulating them in an in-memory buffer. However, if the block is oversized we will not accumulate all the records in the buffer. Instead as soon as the buffer contains more than the maximum number of records allowed in a block, we flush its contents to the oversized blocks destination, and then immediately send all subsequent records to that destination as well. Even if we are working on a huge oversized block like all the "Robert Smith" records, we only require enough memory to store a single correct-sized block. In computer science terms, the memory requirements of the BLOCKING-REDUCER algorithm are constant.

In order to enable a constant-memory BLOCKING-REDUCER algorithm, we construct blocking as an iterative process, writing oversized blocks to disk between each iteration. This trades the I/O for these disk writes for an assurance that we can handle arbitrarily large blocks. Our system also enables us to make a different trade-off on a block-by-block basis. Optionally, you may specify an in-memory blocking threshold. Blocks with a size above this threshold are handled iteratively in the manner described above. Blocks smaller than that threshold are sub-blocked entirely in memory. The sub-blocking algorithm is exactly the same, but intermediary sets of oversized blocks are stored in memory instead of being written to disk. This enables our system to achieve higher performance on smaller blocks that we know will fit in memory.

FIG. 5 shows example pseudo-code of a non-limiting MapReduce version of the sub-blocking algorithm. The mapper functions parallelize the extraction of properties from records performed in the loops beginning in lines Block Line 3 and Sub-Block Line 6 in the recursive blocking algorithm in FIG. 3. The Top-Level-Mapper is run on the first iteration and the Sub-Block-Mapper is run subsequently (see also FIG. 4 item 150). The reducer function enumerates over all the records in a newly-created sub-block, counting them to determine whether or not the block is small enough or needs to be further subdivided. The blocks the reducer deems oversized become inputs to the next iteration. Care is taken that the memory requirements of the reducer function are constant in the size of a fixed buffer because otherwise the reducer runs out of memory on large blocks. Also note that the lexicographic ordering of the block keys allows separate mapper processes to work on different nodes in a level of the binomial tree without creating redundant sub-blocks (e.g. if one mapper creates a Robert ∩ Seattle block another mapper will not create a Seattle ∩ Robert one). This is desirable because individual MapReduce jobs run independently without shared memory or other runtime communication mechanisms.

As we have noted, it is desirable in one example non-limiting implementation to have overlapping blocks. The sub-blocking algorithm will create these, but it will also create redundant work for the linkage component by putting the same pairs of record in multiple blocks. Ideally, the set of pairs would be completely deduplicated, however, doing this incurs an I/O cost. Consider a single record that appears in a block with ten other records. If that block is passed to the linkage component as a whole the record is copied once, whereas if the block is exploded out into its pairs, the same record will be copied nine times. In our example non-limiting system, we have found that this I/O cost cancels out any efficiency gained by eliminating redundant work in the linkage component. We found it most effective to do block-level redundancy elimination. Starting from the output of sub-blocking, we run a MapReduce job that does block deduplication (see FIG. 4 item 160), so that when the same set of records appears with multiple block keys we only save one. The output of this is fed into another MapReduce process that groups together all the sub-blocks that have the same top-level key and only retains those sub-blocks that are not proper subsets of another sub-block. In our example non-limiting implementation, we performed this subset elimination using a version of the algorithm described e.g. in P. Pritchard, "A Simple Sub-Quadratic Algorithm For Computing The Subset Partial Order," *Information Processing Letters*, 56(6):337-341, 1995, but note that subset elimination is an active area of research and there are multiple other algorithms that could be used. See FIG. 4 item 170 ("Subset Elimination").

Additional Dynamic Blocking Features

We have developed two enhancements to the core algorithm described above: ramp and partitioned blocking. In terms of the algorithm expressed above both these features are implemented inside the Oversize function.

For performance reasons, we would like to minimize the amount of sub-blocking iterations we perform on a given set of input records. The longer a sub-block's key, the more properties its records have in common and intuitively the more likely it is that they will represent the same entity. We would be willing for the linkage component to do more work on these blocks, so our system has an optional ramp, a constant factor by which the maximum number of comparisons in a block is increased with each iteration. The ramp parameter gives us a data-driven way to trade off between sub-blocking and linkage work.

In some systems, we may wish to perform incremental linkage. We may receive data at separate times and wish to link new records to profiles generated by an earlier run. When doing this we need to compare new records to new records and new records to profiles, but we do not need to compare profiles to profiles because the linkage system has already deemed these to represent separate entities. Our example non-limiting system allows us to annotate records as belonging to mutually exclusive partitions. These partition annotations serve as instructions for the linkage component to only compare certain pairs in a block. Blocking supports this functionality by being aware of the partition annotations and calculating the number of comparisons present in a block accordingly.

More Detailed Non-Limiting Implementation Example

Figure 6A:
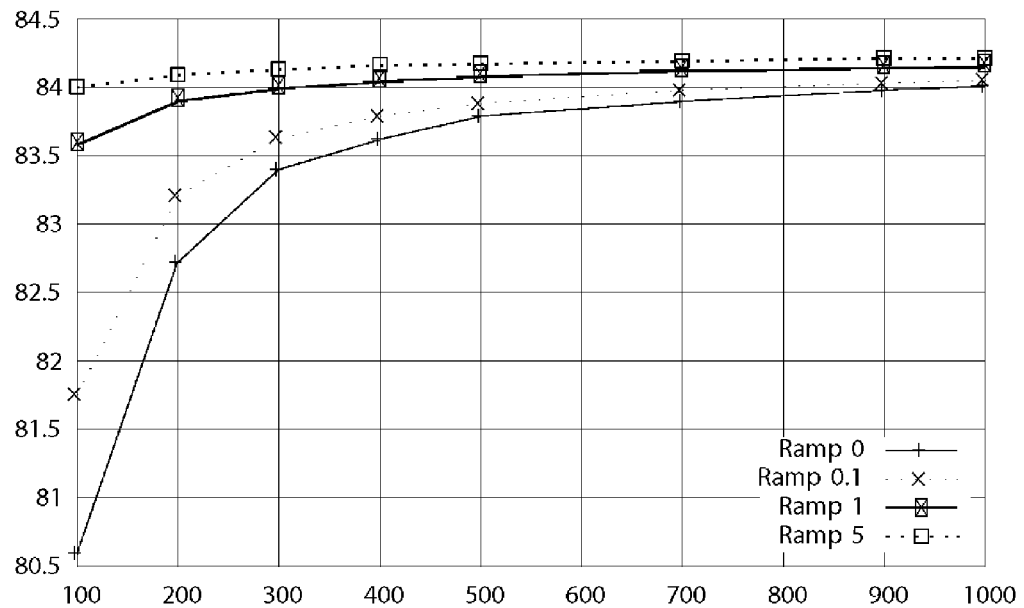
FIGS. 6A and 6B are exemplary illustrative non-limiting graphs showing compression for different blocking parameters wherein FIG. 6A directly shows compression as a function of the max block size and ramp parameters and FIG. 6B shows compression as a function of the number of unique pairs in the blocks.
Figure 6B:
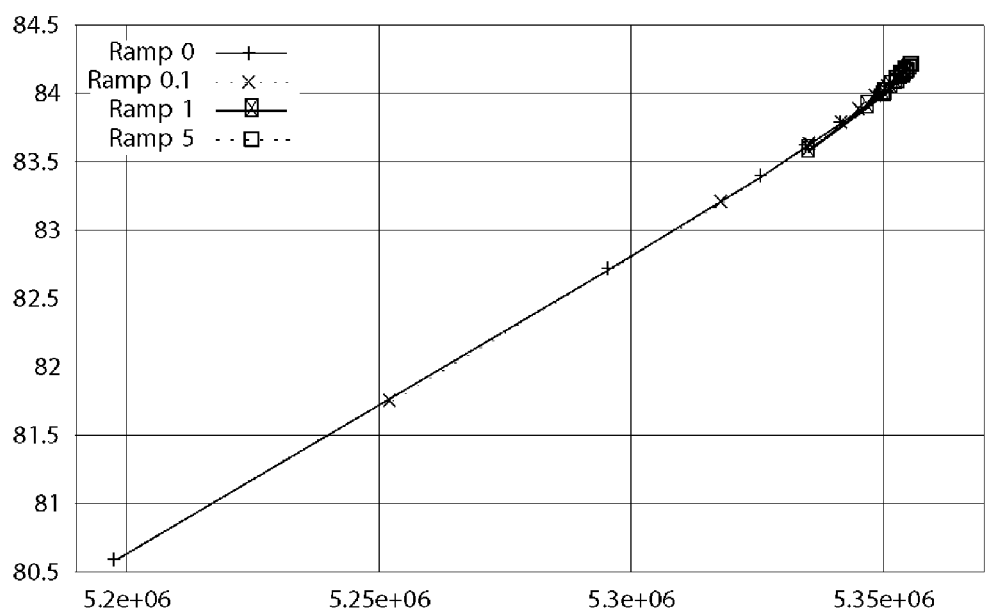
Figure 7:
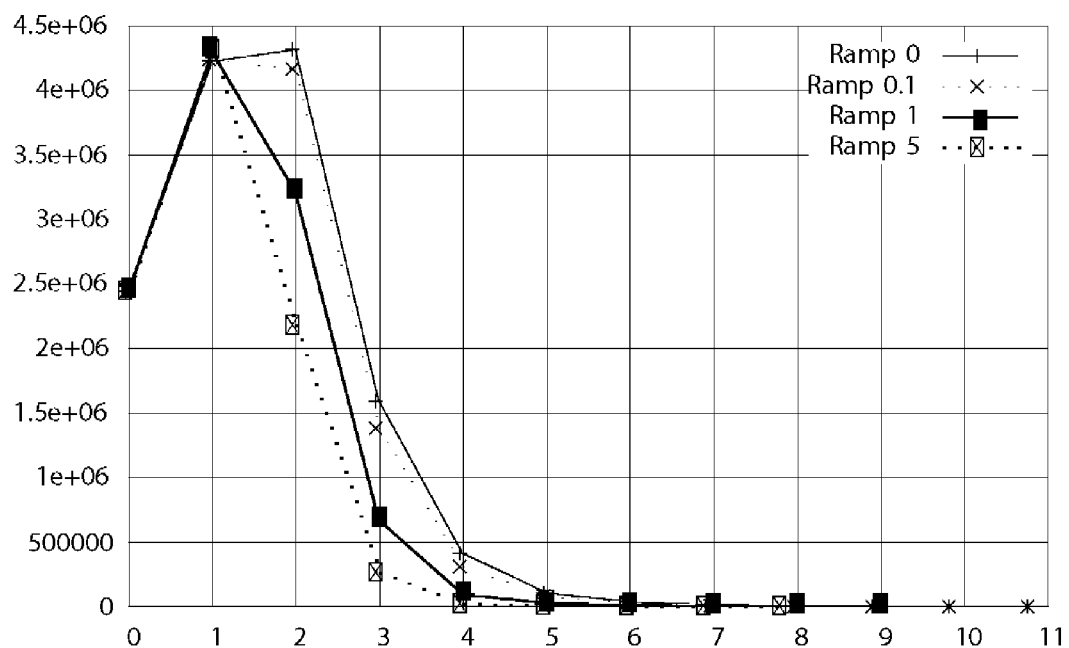
FIG. 7 is an exemplary illustrative non-limiting graph showing the number of correct-sized blocks discovered in each iteration for max block size 300.
Figure 12:
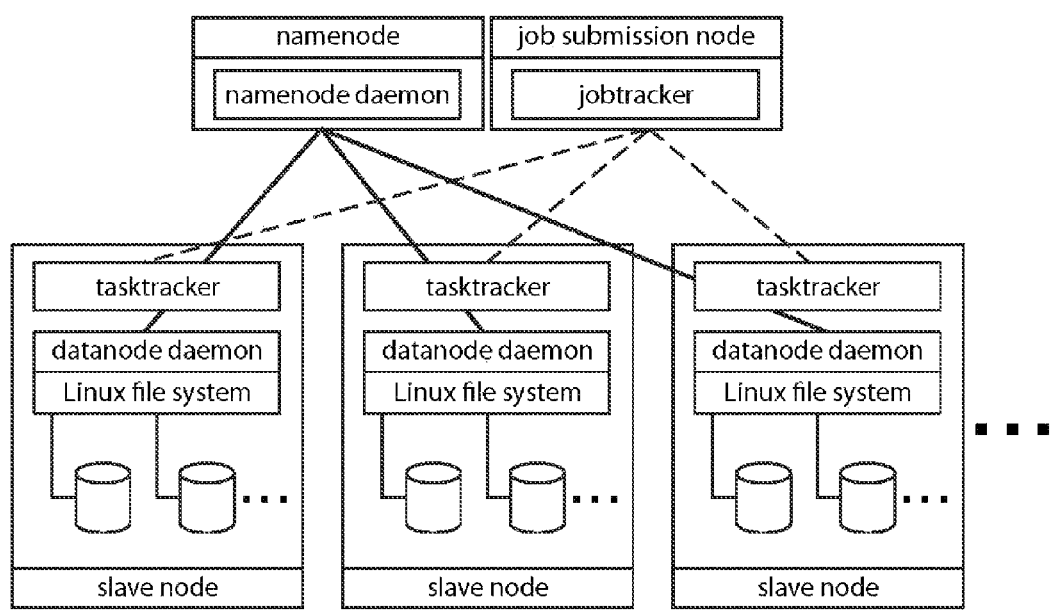
FIG. 12 shows an example non-limiting Hadoop cluster architecture.

FIGS. 4, 8-10 give an overview of the example MapReduce implementation of the blocking algorithm, FIGS. 11 and 12 show an example MapReduce architecture that the blocking algorithm can run on, and FIGS. 6A, 6B and 7 show example results.

Figure 8:
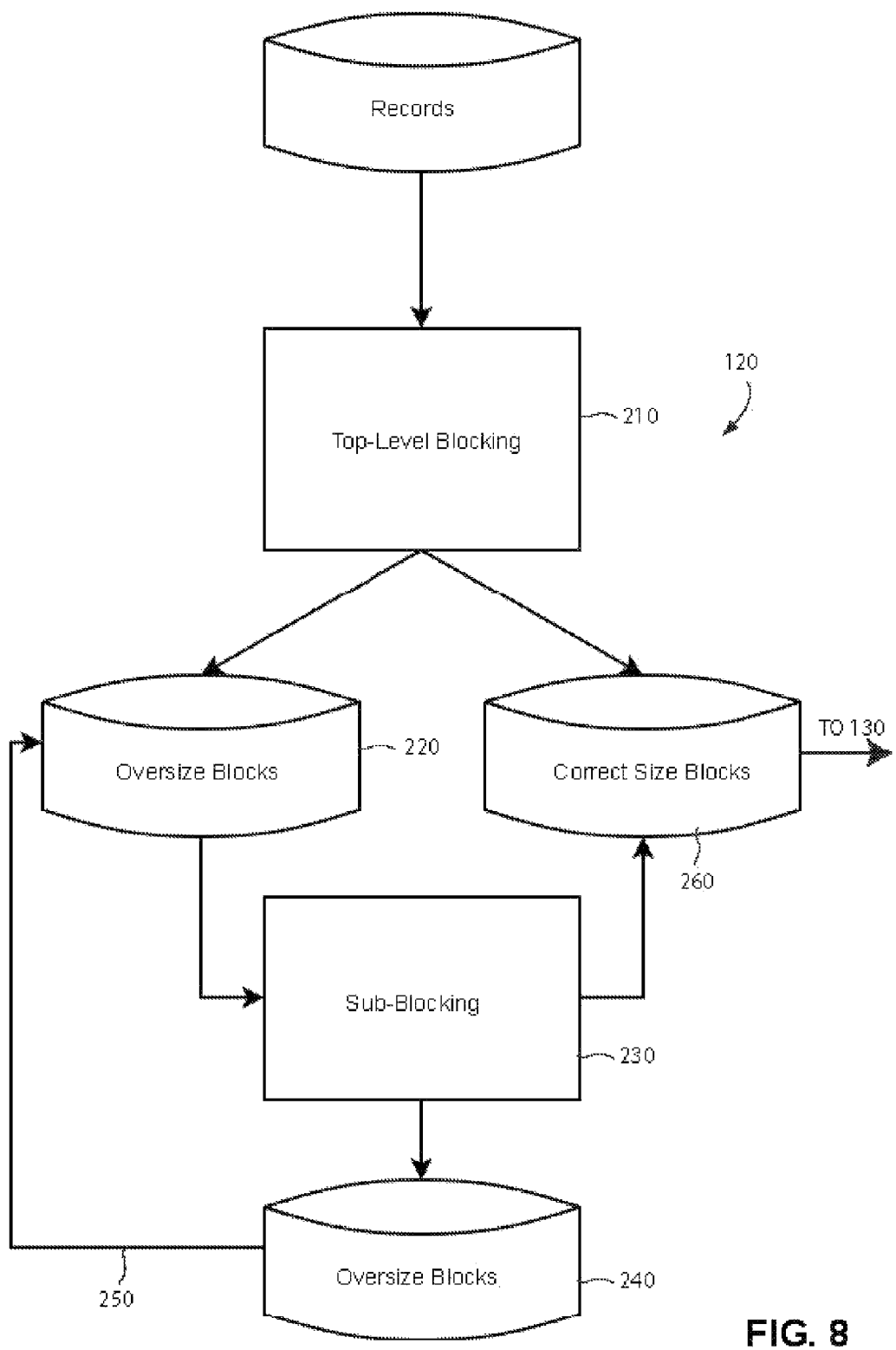
FIGS. 8-10 show overview of an exemplary illustrative non-limiting MapReduce implementation of the blocking algorithm.

The FIG. 8 Iterative Process diagram shows an overview of the entire example non-limiting process. It illustrates that blocking 120 takes a set of records as input and groups them into blocks iteratively. Each iteration produces sub-blocks which can be either correct sized or oversized. The first iteration is called "Top Level Blocking" 210. The oversized sub-blocks 220 produced by top-level blocking 210 are passed into the first "Sub-Blocking" iteration 230. Oversized sub-blocks 240 produced by sub-blocking 230 are passed into subsequent sub-blocking iterations (250). Correct-sized blocks 260 produced by any iteration go into a separate collection that is passed along to the linkage component 130.

Figure 9:
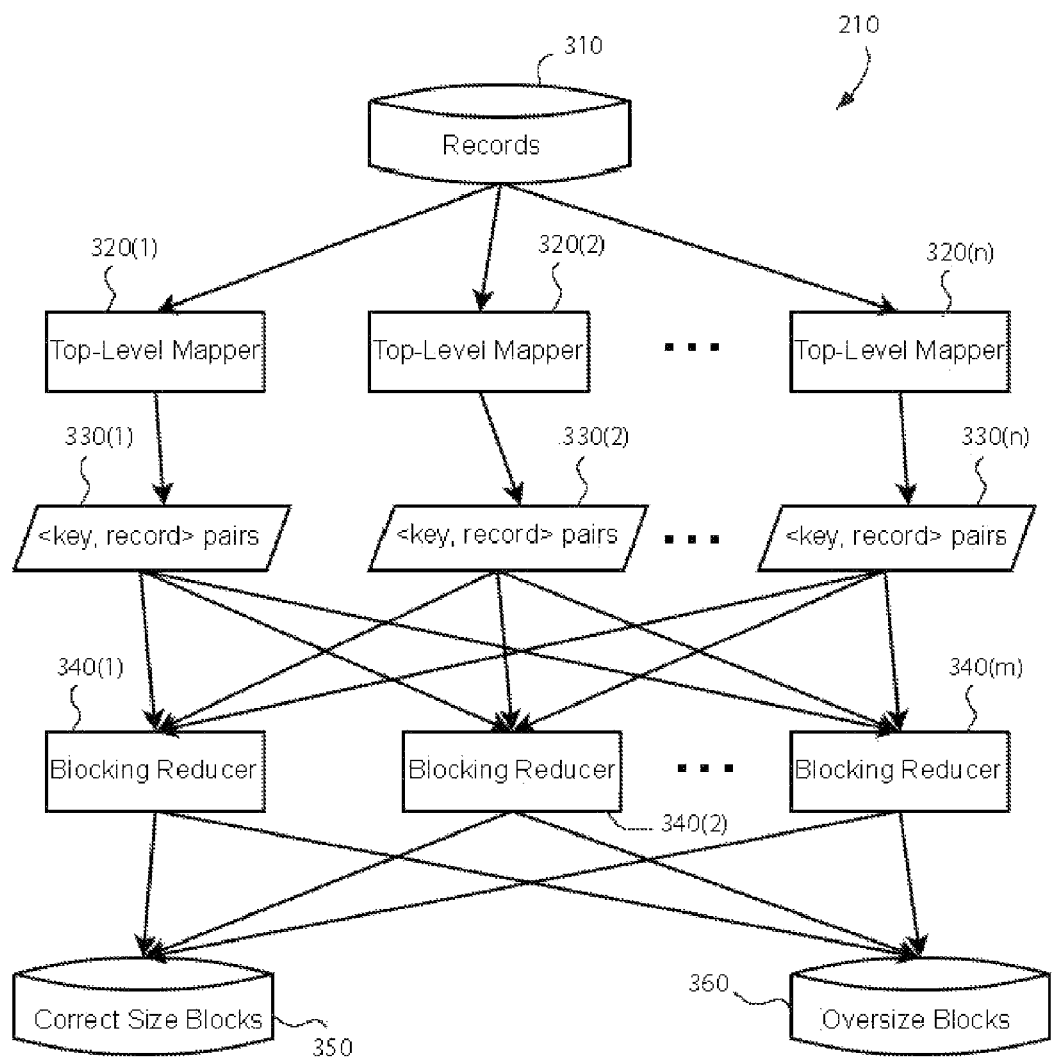

The FIG. 9 "Top Level MapReduce" diagram shows the process in the "Top-Level Blocking" 210 of the FIG. 8 "Iterative Process" in more detail. Likewise, the FIG. 10 "Sub-Blocking MapReduce" diagram shows more detail of the "Sub-Blocking" 230 of the FIG. 8 "Iterative Process". Unlike "Iterative Process", these diagrams illustrate the way the algorithm fits into the MapReduce framework.

"Top Level Map Reduce" 210 shows a set of Records 310 as input. These are passed to a variable number of "Top-Level Mapper" processes 320 running in parallel. (There are three of these boxes in the picture, but they represent an arbitrary number.) Each mapper process 320 corresponds to the TOP-LEVEL-MAPPER algorithm. The output of each mapper 320 is a set of <key, record> pairs 330. The MapReduce framework collects all these pairs, groups them by key, and sends them along to "Blocking Reducer" processes 340. Each of these boxes corresponds to the BLOCKING-REDUCER algorithm. (Again, there may be an arbitrary number, though three are shown here.) Each reducer divides the blocks up into correct size 350 and oversized 360 sets, and the MapReduce framework compiles the output for further processing.

"Sub-Blocking MapReduce" 230 is an almost identical diagram. The only differences are that the input is now a set of oversize blocks 410, the mappers are "Sub-Blocking Mapper" processes 420, and there is an arrow from the "Oversize Blocks" 460 output leading back to the input, indicating that this process repeats as many times as necessary. The mappers 420 in this diagram correspond to the SUB-BLOCK-MAPPER algorithm. The reducer algorithm for the Blocking Reducers 440 is the same as in the "Top Level Map Reduce" diagram.

FIG. 11 shows the general architecture of mappers and reducers running in parallel, mappers producing output in the form of ordered pairs, and the pairs being routed to reducers according to their key values, as is all standard to conventional MapReduce computing. One can readily see how the algorithms of FIGS. 9 and 10 can be implemented using the conventional MapReduce architecture of FIG. 11, where the top level mapper 320 or the sub-blocking mapper 420 are implemented by the MapReduce "mapper", the MapReduce combiner and partitioners can be used to implement functionality associated with the <key, record> pairs 330, 430, and MapReduce's shuffle and sort is used to distribute pairs to MapReduce reducers that implement the Blocking Reducers 340, 440.

Figure 10:
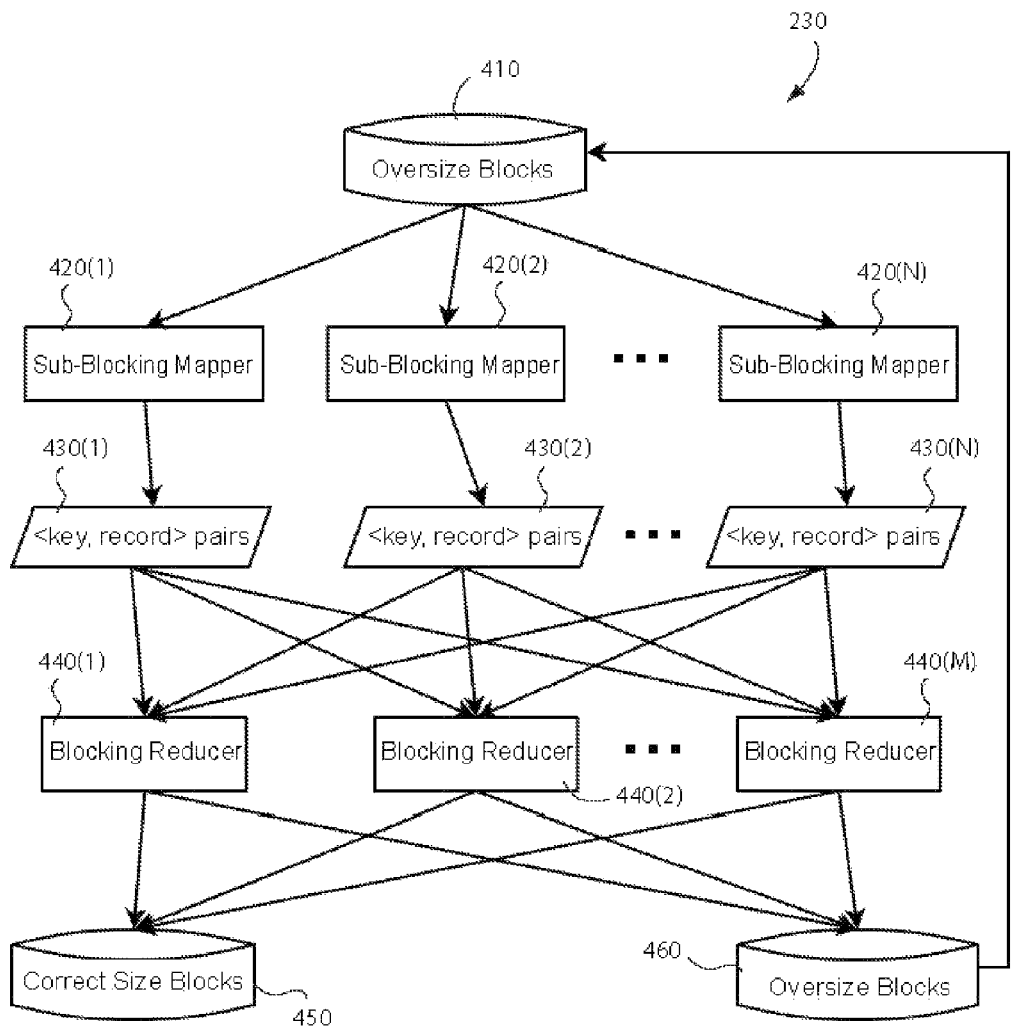

FIG. 12 shows an example non-limiting conventional architecture of a complete Hadoop cluster that can be used to implement FIGS. 9, 10. Such an example non-limiting architecture includes a namenode and a job submission node that support any number of distributed slave computing nodes each comprising a tasktracker and a datanode daemon. Each slave computing node can be implemented using a processor running Linux or other file system and coupled to a non-transitory storage device. The processor in each slave computing node can execute software stored on the non-transitory storage device, such software including the tasktracker and the datanode daemon, which communicate with the namenode and the jobsubmission node to provide distributed parallel processing e.g., in the cloud. Such parallel computing provides scaleability to allow to exemplary illustrative non-limiting implementation to quickly perform dynamic blocking on billions or any other arbitrarily large number of records.

Example Results

We present non-limiting examples that demonstrate the viability of this technique. These examples vary the blocking parameters maximum block size and ramp in runs over a small subset of our production data.

We ran these examples on 5,680,599 records sampled from a full data set of approximately 8 billion. To build this sample, we used all records that contained a first-last name pair that appeared on a list of 262,005 such pairs randomly chosen from the data set. We did name-based sampling instead of random sampling because the vast majority of record pairs in the full data set are not matches. By choosing a broadly individuating property like first and last name, we chose a set of records that will have more matches, focusing these experiments on a region of the problem space where blocking is having an effect.

We chose a sample of this size because we wanted to demonstrate our system's performance at scale. (Though it should be noted this is still a tiny fraction of the actual number of records that may be used in production.) There are approximately $10^{12}$ record pairs in this dataset, making it infeasible to construct a hand-annotated reference set. However, when the linkage model is held constant, blocking does not change the score it assigns to any individual pair, only the number of pairs presented to it. In other words, blocking only affects recall, not precision. For these experiments, then, we treat the results returned by the linkage component as truth. If the model returns a score above a certain threshold (the same as the one we use in production), we treat the pair as a true positive. Otherwise we treat it as a true negative. This process may still lead to false positives, but that is a precision error, the fault of the linkage component 130, not blocking 120 whose job is solely to present the model with the record pairs it will tend to score the highest. We define the compression metric:

$$c = 1 - \frac{\text{output entities}}{\text{input records}}. \qquad (1)$$

We present compression as a percentage. Given 8 billion records, we want to get out something around 275 million entities, because that is roughly the number of adults who have lives in the United States over the last 15 years, including people who have died or emigrated over that span. The higher the compression, the better. As a metric for the full system this isn't going to work, because it does not take precision into account; however, as long as the model is doing something reasonable, compression is a good proxy for recall.

We ran blocking 120, linkage 130, and transitive closure 140 on this sample of data for a range of maximum block size and ramp parameters. We used three top level properties: 1) first and last name, 2) social security number and 3) a tuple of last name, zip code, and house number. We used various sub-properties including various kinds of name and address information. The maximum block size ranged from 100 comparisons to 1000 comparisons, though of course the size of the individual blocks varied. The ramp ranged over various values from 0 to 5.

Table 1 below shows the compression for these parameters. The compression goes up monotonically with maximum block size and ramp. This is to be expected because increasing either of these two parameters increases the number of pairs that will be considered by the linkage component.

TABLE 1

Table of compression versus block size.

|     | 100   | 200   | 300   | 400   | 500   | 700   | 900   | 1000  |
|-----|-------|-------|-------|-------|-------|-------|-------|-------|
| 0   | 80.59 | 82.72 | 83.40 | 83.62 | 83.79 | 83.90 | 83.98 | 84.01 |
| 0.1 | 81.75 | 83.21 | 83.63 | 83.79 | 83.88 | 83.98 | 84.03 | 84.05 |
| 1   | 83.58 | 33.90 | 83.99 | 84.04 | 84.08 | 84.12 | 84.14 | 84.15 |
| 5   | 84.00 | 84.09 | 84.13 | 84.16 | 84.17 | 84.19 | 84.21 | 84.21 |

FIGS. 6A and 6B plot these example compression results, first directly as a function of the maximum block size and ramp input parameters and then as a function of the number of unique pairs present in the blocks. The former shows that the approach to the maximum compression value is asymptotic for the various ramp conditions. It appears that we have reached a maximum compression value of 84.21 for the most liberal settings, which all yield around 5.3 million unique pairs. The FIG. 6B graph illustrates that compression is a linear function of the number of unique pairs considered. The ramp factor affects this function primarily via the fact that higher ramps give rise to more unique pairs. However, the ramp factor can also be used to control the number of iterations required to explore the space.

FIG. 7 shows the number of correct-sized blocks discovered in each iteration for the different ramp conditions, where iteration zero is top-level blocking. The higher ramp factors can improve the performance of blocking procedure by discovering more correctly-sized blocks in the earlier iterations.

While the technology herein has been described in connection with exemplary illustrative non-limiting embodiments, the invention is not to be limited by the disclosure. For example, while MapReduce is used in the example non-limiting implementation, other parallel or other computing platforms are also possible. The invention is intended to be defined by the claims and to cover all corresponding and equivalent arrangements whether or not specifically disclosed herein.

We claim:

1. A method of using a plurality of distributed computing nodes each comprising a processor and associated storage to dynamically block records, comprising:
   (a) using the distributed computing nodes comprising a processor and associated storage, grouping together records of a data set with a first set of shared properties into blocks; and
   (b) using the distributed computing nodes comprising a processor and associated storage, for a block that is intractably large and therefore requires further grouping records into sub-blocks, automatically discovering based on the contents of the intractably large block, at least one second set of shared properties that enables creation of sub-blocks of tractable size, wherein the second set is different from the first set.

2. The method of claim 1 wherein automatically discovering comprises automatically analyzing the set of properties present in records in an oversized block to dynamically guide subdivision of that oversized block.

3. The method of claim 1 further including processing the discovered sets of shared record properties in parallel using the plurality of distributed computing nodes to recursively or iteratively subdivide or partition, based on similar properties, at least one intractably large block into blocks of tractable size.

4. The method of claim 1 further including dynamically adjusting the discovered second set of shared properties in response to the composition of the data set and block size.

5. The method of claim 1 wherein the data set comprises a massive database of personal information from diverse data sources for an online people search.

6. The method of claim 1 wherein discovering applies a ramp parameter by which the maximum number of comparisons in the block of intractable size is increased with each recursion or iteration to provide a data-driven way to trade off between sub-blocking and linkage.

7. The method of claim 1 further including allowing sets of records to overlap.

8. The method of claim 1 further including applying the method to data sets when there is no obvious quickly-calculable metric between records and the number of records makes even a fast calculation for all pairs intractable.

9. The method of claim 1 further including creating multiple top-level blocks that can be worked on independently and in parallel.

10. The method of claim 1 further including dynamically adjusting the creation of sub-blocks based on several record property dimensions along which the records may vary, thereby avoiding the need to define a single ordering that places similar records next to each other.

11. The method of claim 1 further including allowing maximum block size to be a function of block key length.

12. A system for dynamically blocking records, comprising:
   a plurality of distributed computing nodes each comprising a processor and associated non-transitory memory, the nodes each storing in non-transitory storage codes that when executed in parallel:
      groups together records of a data set with a first set of similar properties into blocks; and
      for a block that is intractably large and therefore requires further grouping records into sub-blocks, automatically discovers based on the contents of the intractably large block, at least one second set of shared properties that enables creation of sub-blocks of tractable size, wherein the second set is different from the first set.

13. The system of claim 12 wherein the code automatically analyzes the set of properties present in records in an oversized block to dynamically guide subdivision into sub-blocks.

14. The system of claim 12 wherein the processors process the discovered sets of shared record properties in parallel to recursively or iteratively subdivide or partition, based on similar properties, at least one intractably large block into blocks of tractable size.

15. The system of claim 12 wherein the processors dynamically adjust the discovered second set of shared properties in response to the composition of the data set and block size.

16. The system of claim 12 wherein the data set comprises a massive database of personal information from diverse data sources for an online people search.

17. The system of claim 12 wherein the processors apply a ramp parameter by which the maximum number of comparisons in the block of intractable size is increased with each recursion or iteration to provide a data-driven way to trade off between sub-blocking and linkage.

18. The system of claim 12 wherein the processors allow sets of records to overlap.

19. The system of claim 12 wherein the processors apply reduction to data sets when there is no obvious quickly-calculable metric between records and the number of records makes even a fast calculation for all pairs intractable.

20. The system of claim 12 wherein the processors create multiple top-level blocks that can be worked on independently and in parallel.

21. The system of claim 12 wherein the processors dynamically adjust the creation of sub-blocks based on several record property dimensions along which the records may vary, thereby avoiding the need to define a single ordering that places similar records next to each other.

22. The system of claim 12 further including allowing maximum block size to be a function of block key length.

* * * * *